United States Patent
Parker et al.

(10) Patent No.: US 7,058,689 B2
(45) Date of Patent: Jun. 6, 2006

(54) SHARING OF STILL IMAGES WITHIN A VIDEO TELEPHONY CALL

(75) Inventors: Benjamin J. Parker, Overland Park, KS (US); Shane R. Werner, Olathe, KS (US); Charles Diaz, Olathe, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 718 days.

(21) Appl. No.: 10/085,859

(22) Filed: Feb. 28, 2002

(65) Prior Publication Data

US 2003/0074404 A1  Apr. 17, 2003

Related U.S. Application Data

(63) Continuation-in-part of application No. 10/033,813, filed on Oct. 20, 2001, which is a continuation-in-part of application No. 09/978,616, filed on Oct. 16, 2001, now Pat. No. 6,545,697.

(51) Int. Cl.
*G06F 15/16* (2006.01)

(52) U.S. Cl. ....................... 709/206; 709/204
(58) Field of Classification Search ........ 709/204–206, 709/231
See application file for complete search history.

(56) References Cited

U.S. PATENT DOCUMENTS

| | | | |
|---|---|---|---|
| 5,689,553 A | 11/1997 | Ahuja et al. | |
| 5,764,916 A | 6/1998 | Busey et al. | |
| 5,872,923 A * | 2/1999 | Schwartz et al. | 709/205 |
| 5,896,500 A * | 4/1999 | Ludwig et al. | 709/204 |
| 5,915,091 A * | 6/1999 | Ludwig et al. | 709/204 |
| 5,949,763 A | 9/1999 | Lund | |
| 5,978,835 A * | 11/1999 | Ludwig et al. | 709/204 |
| 6,097,793 A | 8/2000 | Jandel | |
| 6,212,547 B1 * | 4/2001 | Ludwig et al. | 709/204 |
| 6,237,025 B1 * | 5/2001 | Ludwig et al. | 709/204 |
| 6,301,607 B1 * | 10/2001 | Barraclough et al. | 709/204 |
| 6,337,858 B1 | 1/2002 | Petty et al. | |
| 6,343,314 B1 * | 1/2002 | Ludwig et al. | 709/204 |
| 6,351,762 B1 * | 2/2002 | Ludwig et al. | 709/204 |
| 6,353,610 B1 * | 3/2002 | Bhattacharya et al. | 370/352 |
| 6,370,137 B1 | 4/2002 | Lund | |
| 6,381,220 B1 * | 4/2002 | Kung et al. | 370/250 |
| 6,425,131 B1 * | 7/2002 | Crandall et al. | 725/106 |
| 6,539,077 B1 | 3/2003 | Ranalli et al. | |
| 6,674,745 B1 * | 1/2004 | Schuster et al. | 370/352 |
| 6,677,979 B1 * | 1/2004 | Westfield | 348/14.12 |
| 6,704,294 B1 | 3/2004 | Cruickshank | |
| 6,714,536 B1 * | 3/2004 | Dowling | 370/356 |
| 6,798,767 B1 * | 9/2004 | Alexander et al. | 370/352 |

(Continued)

FOREIGN PATENT DOCUMENTS

EP   0 721266   7/1996

(Continued)

*Primary Examiner*—David Wiley
*Assistant Examiner*—Yemane M. Gerezgiher (57) ABSTRACT

A data call between at least two internetworked computers is established using a central server and call clients in the two computers. Once the data call is in place, a video telephony conversation is initiated. In addition, still images such as a slideshow of personal photographs are shared between the two computers while the video telephony call fully continues. Image viewer subclients utilize the same network session as is used by the call clients. Either user can pause, navigate through, or change the display a parameters of the slideshow as it is being viewed by both users.

8 Claims, 7 Drawing Sheets

U.S. PATENT DOCUMENTS

| | | | |
|---|---|---|---|
| 6,831,899 B1 * | 12/2004 | Roy | 370/260 |
| 6,847,388 B1 * | 1/2005 | Anderson | 715/854 |
| 2004/0107253 A1 * | 6/2004 | Ludwig et al. | 709/204 |
| 2004/0107254 A1 * | 6/2004 | Ludwig et al. | 709/204 |
| 2004/0107255 A1 * | 6/2004 | Ludwig et al. | 709/204 |

FOREIGN PATENT DOCUMENTS

| | | |
|---|---|---|
| EP | 0 999712 | 5/2000 |
| EP | 1 059 798 | 12/2000 |
| GB | 2357659 | 6/2001 |
| WO | WO 01/71994 | 9/2001 |

\* cited by examiner

SHARING OF STILL IMAGES WITHIN A VIDEO TELEPHONY CALL

CROSS REFERENCE TO RELATED APPLICATIONS

The present application is a continuation-in-part of pending U.S. application Ser. No. 10/033,813, filed Dec. 20, 2001, entitled "Telephonic Addressing For Establishing Simultaneous Voice and Computer Network Connections", which is a continuation-in-part of prior U.S. application Ser. No. 09/978,616, filed Oct. 16, 2001, now U.S. Pat. No. 6,545,697, entitled "Video Telephony". This application is further related to co-pending U.S. applications Ser. No. 10,058,549, filed Jan. 28. 2002, entitled "Private Sharing of Computer Resources Over an Internetwork"; and Ser. No. 10/058,882, filed Jan. 28, 2002, entitled "Sharing of Prerecorded Motion Video Over an Internetwork," both incorporated herein by reference.

STATEMENT REGARDING FEDERALLY SPONSORED RESEARCH

Not Applicable.

BACKGROUND OF THE INVENTION

1. Field of the Invention

The present invention relates to establishing a video telephony session between users connected to a computer network in order to share still images privately between the users simultaneously with the video telephony call. The still images may typically comprise graphics or pictures to be shared with family or friends over the Internet. For example, the pictures can have been taken using a digital still camera or could be scanned photographs.

Internetworking (i.e., the interconnection of many computer networks) allows the interaction of very large numbers of computers and computer users. The most well known example is the Internet. Computers connected to the Internet may be widely separated geographically and utilize many different hardware and software configurations. In order to achieve communication sessions between any two endpoints on the Internet, an addressing system and various standard protocols for exchanging computer data packets have been developed.

2. Description of the Related Art

Each packet sent over the Internet includes fields that specify the source and destination address of the packet according to Internet Protocol (IP) addresses assigned to the network interface nodes involved. Currently assigned addresses comprise 32 bits, although future standards allow for 128 bit addresses. The 32 bit addresses are normally written by breaking the 32 bits into 4 groups of 8 bits each and writing the decimal equivalents of each group separated by periods (e.g., 208.25.106.10).

Since numerical IP addresses are inconvenient to use and remember, a protocol for assigning and accessing logical names is used known as the domain name system (DNS). DNS servers are deployed within the Internet which perform a translation function between a logical domain name such as "sprint.com" and its numerical equivalent "208.25.106.10". After receiving an IP address back from a DNA server, a computer can forward data packets to the IP address and establish a connection or session with the remote computer.

While the DNS system works well for hosted content (e.g., material made available for browsing by commercial and private entities), it is not well suited to ad hoc communications or exchanges of data between individuals. Hosting a website and registering an IP address within the DNS system is expensive and time consuming. Furthermore, due to an impending shortage of IP addresses and the cost for maintaining use of each IP address, many Internet service providers assign IP addresses dynamically to their individual users. In other words, when a user signs on to their service, they are temporarily assigned an IP address from an address pool assigned to their service provider. The user occupies that IP address only for their current session.

Even when individual users have their own static IP addresses, and when other users can remember the IP address of a user with whom they would like to establish a connection session over the Internet (e.g., for voice or video telephony), the need to configure their hardware or software is too complex for many users. This is one reason why e-mail is such a popular and successful Internet application. A mail server with an easy to remember domain name acts as intermediary between two individual users. Using a simple application program and the recipient's account name on the mail server (i.e., their e-mail address), text messages and computer files can be exchanged. The exchange, however, does not allow the users to interact in real time. Thus, there is a need for a way to allow two or more individual users to establish interactive connection sessions over the Internet without requiring overt knowledge of the other's IP address and without complicated configurations or set-ups.

Copending applications U.S. Ser. No. 09/978,616 and U.S. Ser. No. 10/033,813 teach the use of a central server allowing two or more individual users to establish interactive connection sessions over the Internet without requiring overt knowledge of the other's IP address and without complicated configurations or set-ups. Each user registers with the central server, resulting in a database of users and their current IP addresses. A calling user sends a request to the central server to establish a connection with a called user. The central server can either relay all network message packets between the users for the duration of a "call", or it may provide the IP addresses to the users so that they can exchange packets directly. The called user may be identified within the database by information well known or easily discovered by other users, such as their telephone number. A telephone call may be established simultaneously with establishing the computer network session, thereby enhancing the user interaction regardless of the type of computer data to be exchanged (e.g., video frames, computer files, etc.). In one embodiment, the computer network session is automatically established in response to the act of dialing the called user's telephone number.

The functions of identifying the called telephone number, forwarding a call request to the central server, and conducting a packet exchange during a data call are performed by a specific software application program referred to herein as a call client. A particular call client may include provision for exchanging certain types of data for preselected purposes and according to predefined protocols. In particular, the call client handles the transmission of live video images from a video camera coupled to the computer and the reception and displaying of live video images sent from the other user.

During a video telephony call, it would be desirable for the users to share additional types of data, such as still images or photographs, without requiring complicated set-up or installation or complex procedures.

SUMMARY OF THE INVENTION

The present invention provides the ability to share still images simultaneously to both users in an easy to use system.

In one aspect of the invention, a method is provided for sharing still images between first and second computers connected to an internetwork for exchanging network packets therebetween, wherein each of the computers has a respective private IP address within the internetwork. A central server coupled to the internetwork contains a database of IP addresses of registered computers. First and second call clients run in the first and second computers, respectively, for establishing a data call between the first and second computers in response to the database of IP addresses. The data call comprises live video exchange from at least one video camera coupled to one of the first and second computers and comprises a network session between the first and second call clients. A voice telephone call is established between first and second users of the first and second computers, respectively, and at least one of the first and second users is seen in the live video exchange. The first user initiates or launches a first image viewer subclient under control of the first call client. The first image viewer subclient loads and displays still image data specified by the first user on the first computer. The first image viewer subclient transmits the still image data to the second computer using the network session. The second call client in the second computer receives the still image data, runs a second image viewer subclient, and loads the still image data into the second image viewer subclient. The second image viewer subclient displays the still image data on the second computer. The live video exchange is maintained simultaneously with display of the still image data by the image viewer subclients.

DETAILED DESCRIPTION OF PREFERRED EMBODIMENTS

Figure 1:
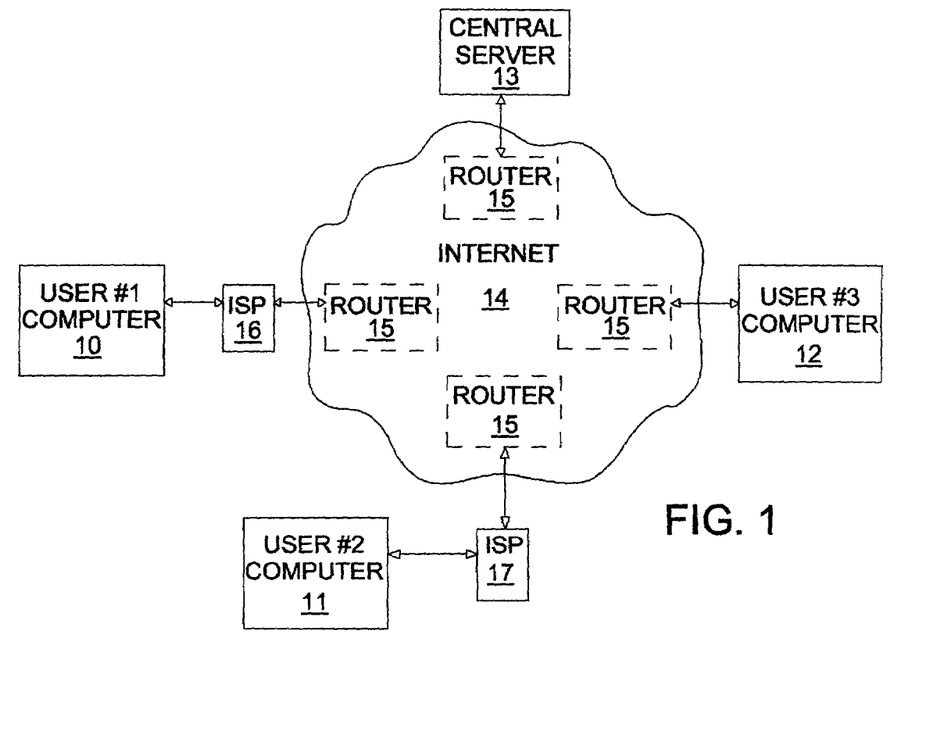
FIG. 1 is a block diagram showing the interconnection of users over the Internet to the central server of the present invention.

Referring to FIG. 1, a plurality of user computers 10, 11, and 12, and a central server 13 are internetworked via the Internet 14. A plurality of routers 15 within Internet 14 direct packets between various endpoints or nodes. Computers 10 and 11 are shown as being connected to Internet routers belonging to Internet Service Providers (ISP's) 16 and 17, respectively. The connections to the ISP's may be by dial-up, digital subscriber line (DSL), cable modem, or integrated access device (IAD), for example. Central server 13 and computer 12 are shown directly connected to a router.

Network communication comprises data messages or packets transferred between separate endpoints, such as between computers 10, 11, or 12 (as clients) and central server 13. The packet transfer is accomplished by routers 15 using the IP addresses contained in each packet. Central server 13 typically has a fixed IP address that is listed on the DNS servers accessible to each computer. Each computer user can easily communicate with central server 13 by supplying its logical name (e.g., www.sprint.exchange.com) which is automatically resolved by their browser into an IP address by consulting a DNS server. Exchanging packets between users 10, 11, and 12 themselves cannot usually be accomplished in the same way because the users and their IP addresses are not listed in the DNS system. Furthermore, users 10, 11, and 12 may not wish to allow remote access into their computers except in certain circumstances.

Figure 2:
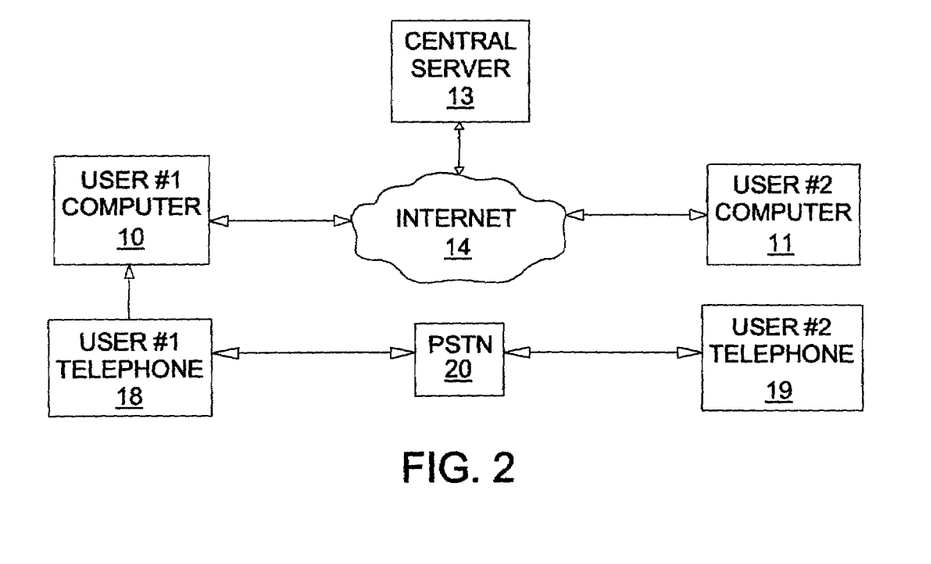
FIG. 2 is a block diagram showing a user connection model of the present invention.

The present invention facilitates exchanging data messages between two individual users by providing a specialized directory or look-up within central server 13. As shown in FIG. 2, the present invention may be used within a system that functions to simultaneously establish a voice telephone call between the two individual computer users. In certain embodiments, the voice call serves as the user action that initiates the computer processing to establish the computer-to-computer connection. In addition, the voice call provides a way to alert the called party of the request to establish the computer connection and then serves to enhance the interaction between the two users during the exchange of computer data. However, the present invention also provides other methods for initiating the computer processing, and a simultaneous voice telephone call is not necessary in the present invention.

Regarding the embodiment with a simultaneous voice telephone call in FIG. 2, computers 10 and 11 have associated telephones 18 and 19 used by the same respective users. The computers and telephones may be fixed installations (e.g., in a residence or a business office) or may be mobile devices (e.g., laptop computer and cellular phone), as long as both are accessible to each user at the same time. The telephones are connected to the public switched telephone network (PSTN) 20. Central server 13 provides a user look-up and interconnecting service for registered users. For security and/or billing purposes, access to the service preferably is tied to user ID's and passwords. A user may be given an ID and password with initial sign-up for the service. Each user would manually configure the telephone number that they want to be associated with. When the user is "on-line" (i.e., has their computer turned on and connected to Internet 14), their computer sends a registration message to central server 13 to notify it that the user is available. Central server 13 can inspect the registration message to determine the current IP address and port number at which the user resides for its current connection session. Alternatively, the user may manually configure their IP address in some circumstances. Upon registration, central server 13 may preferably determine whether the user has a respective firewall as described in copending U.S. application Ser. No. 10/034,012, incorporated herein by reference. In any case, central server 13 contains a database of currently active, registered users. Each user entry in the database includes fields for user ID, password, telephone number, and IP address (including port number), user status, and a firewall flag, for example.

In the connection model of FIG. 2, a user #1 dials telephone 18 to make a voice call to a user #2 at telephone 19. The telephone number dialed by user #1 is captured as a target telephone identifier number and sent to a call client (i.e., an application program for managing the data call) in computer 10 being used by user #1. Computer 10 forwards the target telephone number to central server 13 as part of an access request for establishing a connection with user #2. Central server 13 looks up the target number in its database. When it finds the target number, central server 13 identifies the IP address associated with user #2 and sends an initiation message to computer 11 being used by user #2. When computer 11 receives the initiation message, it launches its own call client. The initiation message may identify user #1 (preferably by both telephone number and user ID) and the type of data to be exchanged (i.e., the application program or how the call client should be configured to receive the data). User #2 answers the telephone voice call and learns that an initiation message was sent to their computer. Using computer 11, user #2 can verify the calling party as user #1 and can indicate whether they accept the computer network connection (i.e., the data call) with user #1. Once user #2 accepts, data messages can be exchanged between the call client application programs running on computers 10 and 11. The call client application programs can be written to perform file transfers of various types of files, video data or frames for video telephony, or other real-time data or control signals. It may also be desired by a user to share computer data or other computer resources besides the data or file types that have been programmed into the call clients, as described below.

Figure 3:
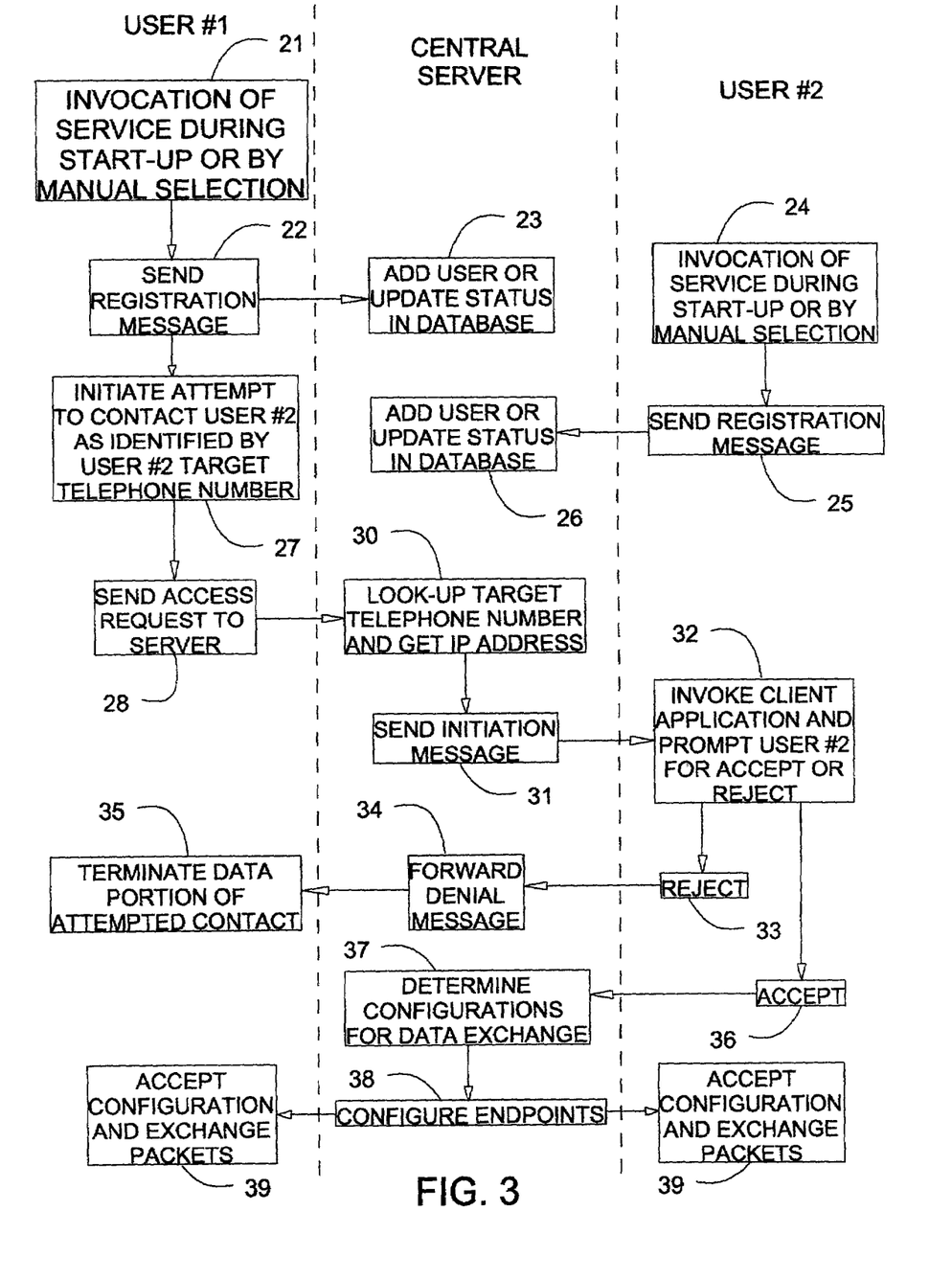
FIG. 3 is a flow diagram of the establishment of a data call used in the present invention.

The sequence of events occurring to establish a data call is shown in greater detail in FIG. 3, in which user #1 events are in the left column, central server events in the center column, and user #2 events in the right column. In step 21, user #1 invokes the real-time interconnection service of the present invention. This can be configured as part of the normal start-up of their computer or can result from manually launching a software application such as the call client after start-up has finished. When the service is invoked by user #1, a registration message is sent to the central server in step 22. The registration message preferably includes the user ID and password assigned to user #1. In addition, the application software that creates the registration message may also determine the local IP address being used by the computer and includes this as data within the registration message. The registration message would typically also include the telephone number being used by user #1. In addition to the IP address being explicitly added to the message by the application program for user #1, the IP address (and port number) is typically embedded in each packet forwarded by the network and the central server preferably extracts the automatically embedded IP address and port number. In step 23, the central server receives the registration message and adds the new user to the database or updates the user status, as necessary.

Separately, user #2 invokes the real-time interconnection service in step 24. User #2 sends a registration message in step 25, and the central server receives the registration message and adds user #2 to the database or updates the user status, as necessary. Thereafter, the central server may periodically exchange further messages with each registered user to keep the user status current and to maintain an open session with each user, for example. When a user shuts down their application program or their computer, an unregister message (not shown) may also be sent to the central server.

During the time that user #1 is on-line, user #1 desires to exchange computer data with user #2. In step 27, user #1 initiates an attempt to contact user #2 and set up the data exchange. In a preferred embodiment, user #1 may identify user #2 by virtue of user #2's telephone number. This target telephone number may preferably be captured from the act of dialing it on user #1's telephone equipment. According to one example, a dedicated module may be connected to user #1's telephone to detect the DTMF tones while dialing and to send the dialed number to user #1's computer. The target telephone number for use #2 is included in an access request message sent to the central server in step 28.

In step 30, the central server looks up the target telephone number and gets the IP address (and port number) associated with user #2. The initiation message is sent by the central server in step 31.

User #2 receives the initiation message in step 32. If not already running, the user #2 computer launches the appropriate call client application for responding to the initiation message and then prompts user #2 to either accept or reject the access request. If rejected, then user #2 generates a reject message in step 33 and sends it to the central server. In step 34, the central server forwards the reject message to user #1, which then terminates the data portion of the attempted communication session in step 35 (the voice telephone call is accepted, rejected, or terminated separately).

If user #2 accepts the attempted contact and the request for data exchange, then user #2 causes their computer to generate an accept message in step 36 (e.g., by clicking an "accept" button in an application interface of the call client) and sends it to the central server. In step 37, the central server determines any needed configurations for accomplishing the data exchange and then configures the user #1 and user #2 endpoints in step 38. The two main configurations for the data exchange will be described in connection with FIGS. 4 and 5 and are selected on the basis of detected firewalls, for example. The user #1 and user #2 computers accept the configuration and then begin to exchange the data messages or packets in step 39. Other configuration issues, such as the configuration of the client application programs exchanging the actual data messages can be handled within the access request message, the initiation message, the accept message, and/or other packets exchanged between the endpoints, for example.

Figure 4:
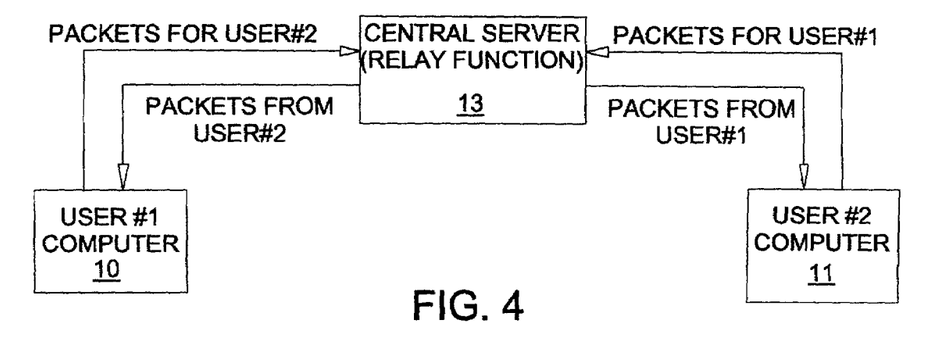
FIG. 4 is a block diagram showing a first embodiment of packet flow for a data call.

A first packet exchange configuration is shown in FIG. 4 wherein central server 13 performs a relay function such that all packets exchanged between computer 10 and computer 11 pass through central server 13. In other words, after a desired user (called party) accepts the data call and central server notifies the first user (calling party) of the acceptance, both endpoints continue to address their sent packets to central server 13. At central server 13, each packet is redirected by substitution of IP addresses. For example, a packet sent from computer 10 including its own IP address as the source address of the packet and the IP address of central server 13 as the destination address of the packet is modified after being received by central server 13 to have the central server's address as its source address and to have the IP address of computer 11 as its destination address. After modification, central server 13 sends the packet back to its router and on to computer 11. The same operations are used to send packets from computer 11 to computer 10. The embodiment of FIG. 4 has the advantage that greater privacy of a user's IP address is maintained since each user's computer only needs to see the IP address of central server 13. Furthermore, this configuration can readily function in the presence of network address translation (NAT) firewalls at the endpoints.

Figure 5:
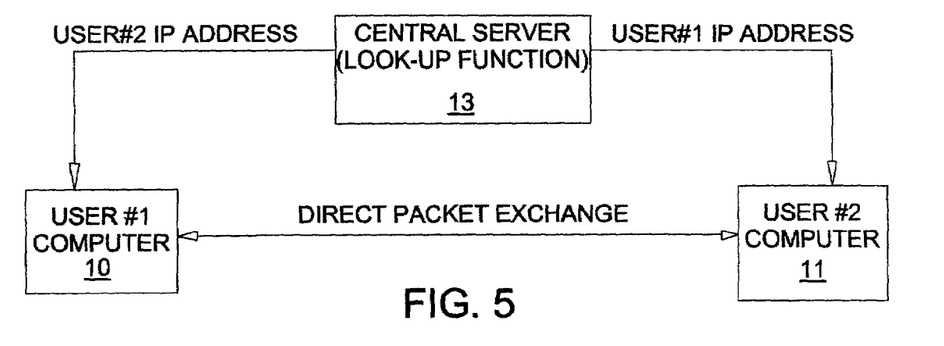
FIG. 5 is a block diagram showing a second embodiment of packet flow for a data call.

FIG. 5 shows an alternative configuration in which direct packet exchange between computers 10 and 11 is realized. Central server 13 provides a look-up function and a connection initiation function. If desired user #2 (called party) accepts a data call, then central server 13 provides the IP address of computer 11 to computer 10 and provides the IP address of computer 10 to computer 11. Thereafter, each computer can send packets addressed to the other computer and the packets are no longer relayed through central server 13. This embodiment has the advantage that central server 13 may be reduced in size since less traffic flows through it.

The use of either connection method of FIG. 4 or FIG. 5 is transparent to the users. Once either type of data call is established and the call clients are exchanging data messages over the internetwork, a video telephony call is conducted by exchanging live video images between the users.

Figure 6:
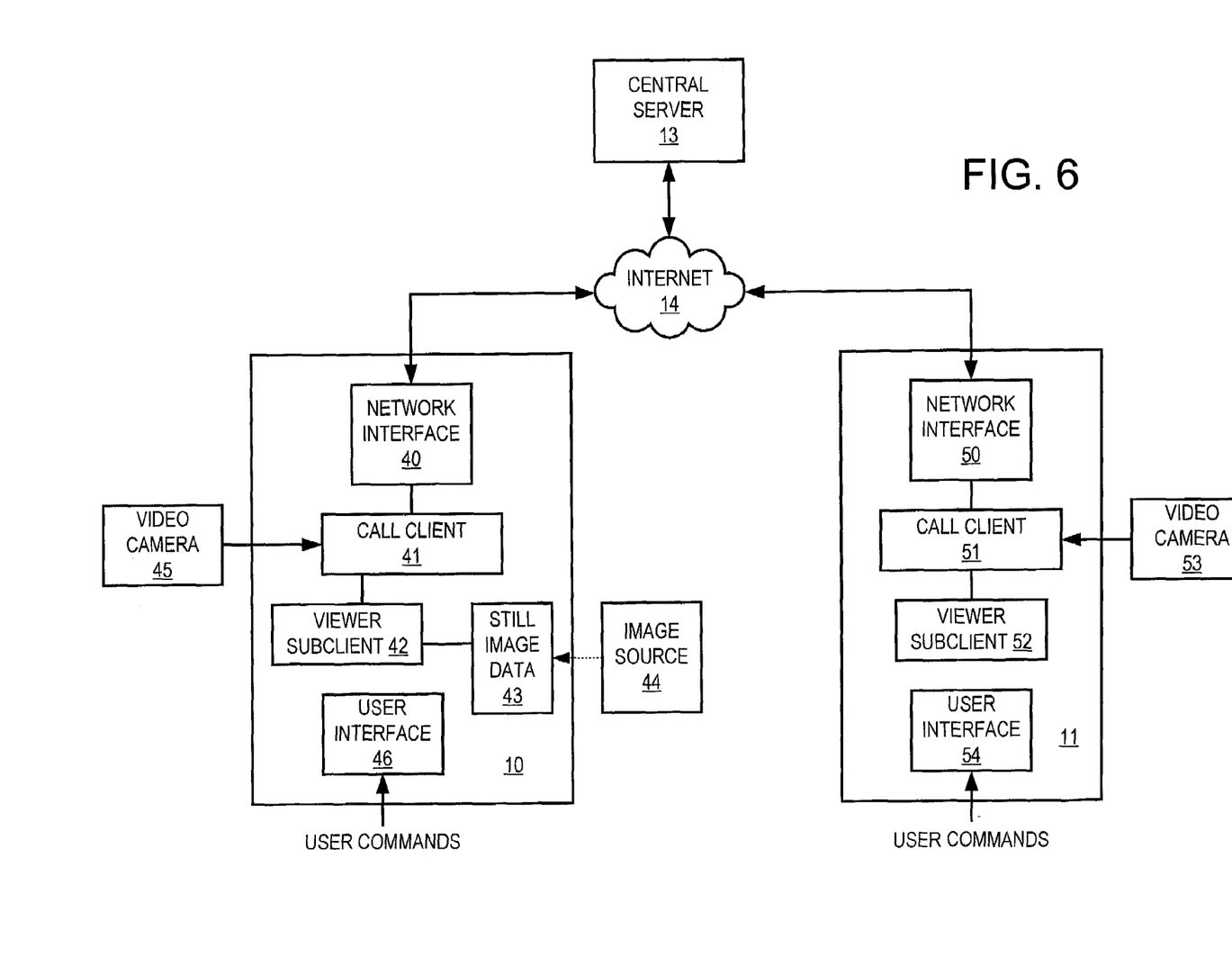
FIG. 6 is a block diagram showing the elements within each computer for accomplishing the sharing of still images between the computers.

Once a video telephony call is established, still images can be exchanged as shown in FIG. 6. Computer 10 includes a network interface 40 and a call client 41 performing the functions already described. A video camera 45 provides live video images to call client 41 which formats video frames for transmission as the video portion of the video telephony call. Computer 10 also runs an image viewer subclient application 42 for loading, displaying and transmitting graphical still images (e.g., compressed digital photographs) from a still image data memory 43. The image data is preferably stored in compressed graphic files, such as jpg files. Still images stored in memory 43 may be obtained from an image source 44 (e.g., a digital camera or an optical scanner) connected to computer 10 or could be downloaded from other computer sources (e.g., from the Internet or from floppy discs). A user interface 46 may, for example, include operating system software and input/output devices (e.g., monitor, mouse, and keyboard) by which a user interacts with (e.g., provides user commands to) call client 41 and image viewer subclient 42.

Viewer subclient 42 operates under control of call client 41. Call client 41 preferably includes a command for launching viewer subclient 42 such as a mouse button or a pulldown menu for indicating that the user wants to display and transmit still images in conjunction with an ongoing video telephony call. When it is running, viewer subclient 42 is linked to call client 41. The image data to be transmitted from viewer subclient 42 is preferably handled using the same IP address and port as are assigned to call client 41. Due to the coordinated interaction of call client 41 and viewer subclient 42, no separate network session needs to be created in order to exchange still images or subclient control commands with another user.

Computer 11 includes a network interface 50, a call client 51, an image viewer subclient 52, a video camera 53, and a user interface 53. Computer 11 may also have local still image data accessible by viewer subclient 52, but need not have any in order to receive and display the transmitted still image data from computer 10.

Figure 7:
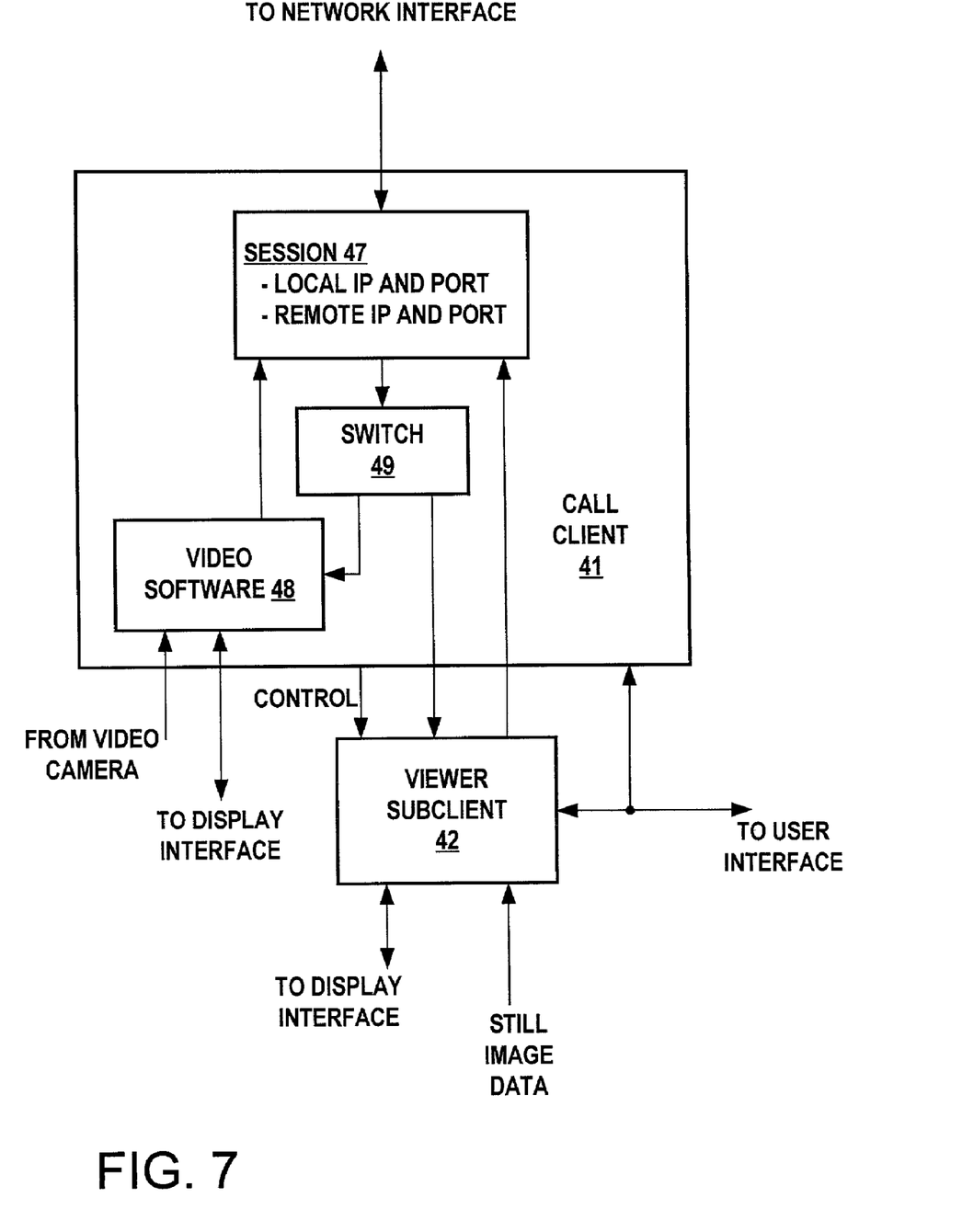
FIG. 7 is a block diagram showing the elements of the computers in greater detail.

FIG. 7 shows the operation of call client 41 and image viewer subclient 42 in greater detail. In establishing the data call (e.g., a video telephony call), call client 41 creates a network session 47 between itself (as referenced within computer 10 by the local IP address of computer 10 and the port address used by call client 41) and, depending upon the connection mode, either central server 13 or remote computer 11 (as referenced within computer 10 by a remote IP address and port address which were provided by central server 13). Using conventional network protocols, data is exchanged between computers 10 and 11. One-way or two-way video data is passed between session 47 and video software 48. Video software 48 processor video from the video camera and forwards it to session 47. Video software 48 also processes remote video data received from session 47 and feeds it to a display interface within the overall user interface.

Prior to viewer subclient 42 becoming active, all network traffic through session 47 is routed to/from video software 48. Once viewer subclient is active and transmitting still images, a switch 49 is activated in call client 41 for properly directing the received network packets to the correct application. When subclient 42 is the one sending still images to a remote user, the image data itself is coupled directly to session 47, bypassing switch 49. Even while sending, subclient 42 may receive network traffic from the remote viewer subclient since either subclient can control the still image display (e.g. by generating pause, rewind, and other picture browsing commands). These received commands also pass through switch 49. The switching is preferably based upon a flag or other identifying data encoded at the appropriate protocol level within the packets generated by either viewer subclient.

Figure 8:
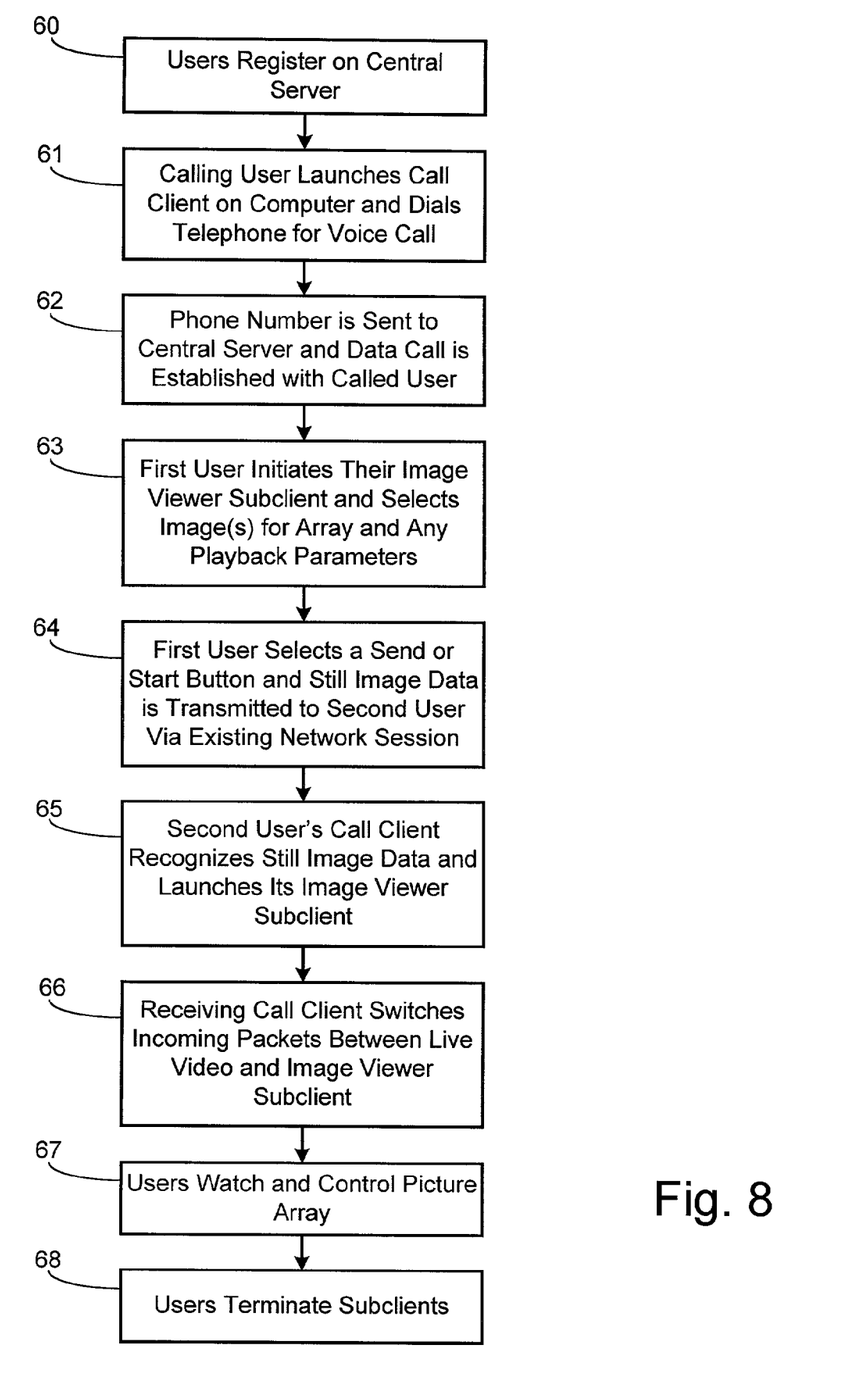
FIG. 8 is a flowchart showing a preferred embodiment of a method for sharing still images in conjunction with a video telephony call.

An overall method of the present invention is shown in FIG. 8. In step 60, multiple user sign-on or register with the central server. A calling user launches their call client on their computer in step 61. Preferably, the calling user makes a telephone call to the called user, and the act of dialing the telephone number may send a signal to the computer for automatically launching the call client if it is not already running. Alternatively, no telephone call is necessary and the calling user may enter a telephone number or other identifying information of the called user into the call client. In step 62, the phone number or other identifying information is sent to the central server and a data call is established with the called user.

In step 63, a first user (i.e., either the calling or called user) initiates their image viewer subclient. The first user selects one or more images that they would like to transmit to the other user. For example, a series of photographs may be arranged into an ordered array or slideshow. Alternatively, such a slideshow can be defined in advance of the video telephony call and then selected in step 63. Any parameters for displaying and transmitting (i.e., playing back) the array or slideshow are selected by the user, such as display time for automatic advancing of the pictures.

In step 64, the first user generates a command in the user interface for initiating the actual transmission of the selected still image data to the other user (e.g., by selecting a send or start button in the viewer subclient). Consequently, the still image data is transmitted to the other user within the existing network session of the video telephony call. In step 65, the receiving user's call client recognizes the reception of still image data packets and launches its own image viewer subclient and loads and displays the still images as they are received. Thus, the image viewer subclients show the same still image or picture simultaneously, allowing the two users to view the still image and to still see and hear each other at the same time.

During the still image presentation, the call client at the receiving end switched incoming network packets between the live video software and the image viewer subclient in response to identifying data in the packets. Both users watch and control the picture array or slideshow in step 67. At the end of the presentation of still images, the users may terminate their image viewer subclients in step 68.

Figure 9:
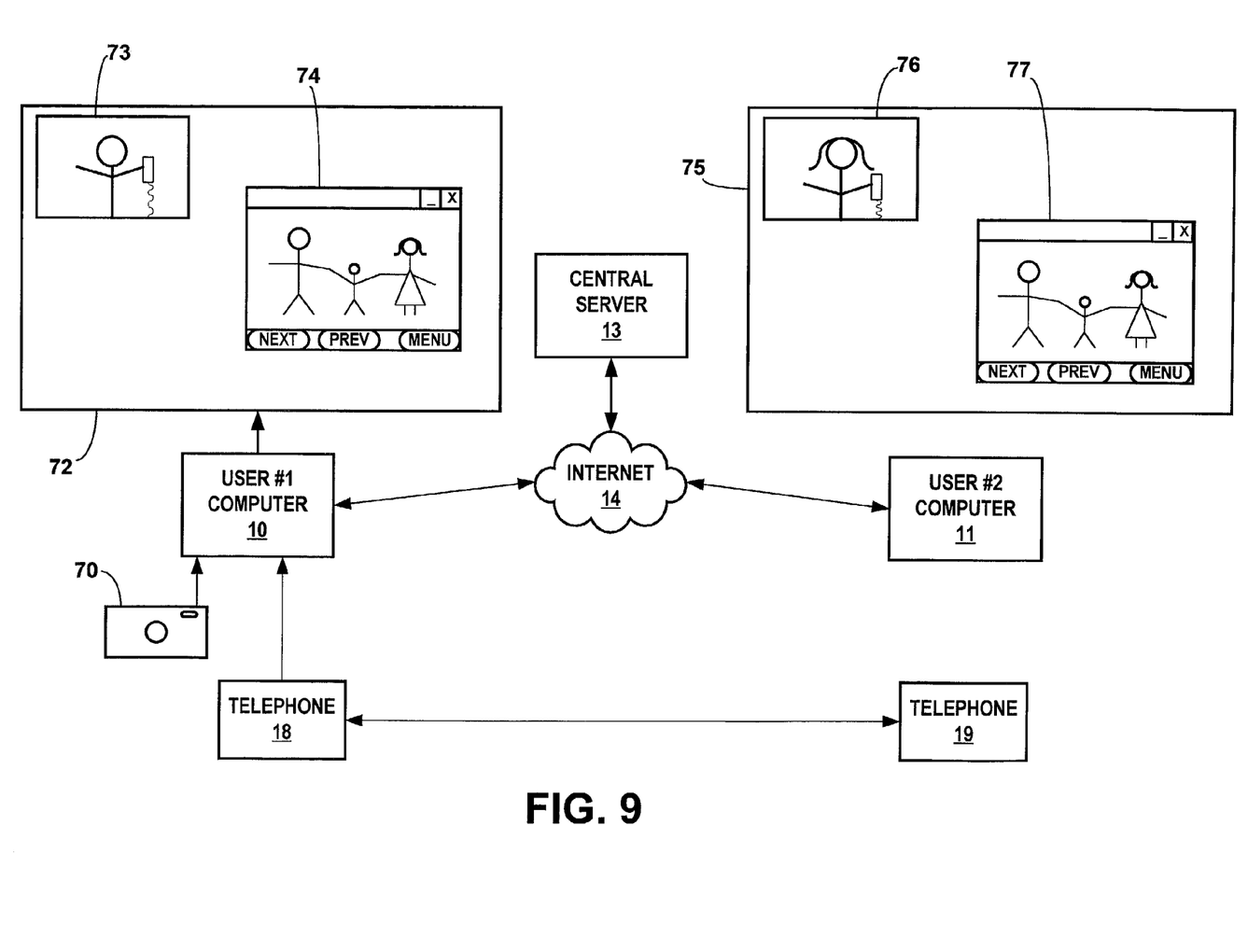
FIG. 9 is a block diagram graphically depicting the operation of the present invention.

The user experience of simultaneous video telephony and sharing of still images is shown in FIG. 9. Still image data as used herein refers primarily to any digitized still images or graphics in a computer file format compatible with the image viewer subclients. Such images may typically be generated by a digital still camera 70, for example. Images are downloaded from camera 70 into computer files stored in computer 10 via a universal serial bus (USB) interface, for example. Computer 10 preferably compresses the image data to facilitate transfer over Internet 14 to computer 11.

Computer 10 includes a display monitor 72 and computer 11 includes a display monitor 75. During a video telephony call, call windows 73 and 76 show live video received from the other endpoint of the video telephony data call. To share still images, computers 10 and 11 launch viewer windows 74 and 77 on monitors 72 and 75, respectively, so that both users are seeing the same still images at the same time. Due to the low bandwidth required to send still image data, the video telephony call can be easily maintained at the same time thereby allowing the users to see each other and to discuss the still images as they are viewed. During the still image presentation, several viewer control are preferably active so that viewing of the images is jointly controlled (e.g., either user can navigate to a next or previous image or access a menu to modify the automatic display parameters by mouse clicking on the corresponding control buttons in viewer windows 74 and 77). Alternatively, the viewer controls may be set up so that only one user (e.g., the sending user) can control the viewing of the images.

While the present invention has been described with respect to two users sharing still images, the invention also contemplates that three or more users could simultaneously view images or participate in a video telephony call. In that case, the sending subclient would multicast to each of the remote computers, for example.

What is claimed is:

1. A method of sharing still images between first and second computers connected to an internetwork for exchanging network packets therebetween, wherein each of said computers has a respective private IP address within said internetwork, said method comprising the steps of:
    maintaining a central server coupled to said internetwork and containing a database of IP addresses of registered computers;
    running first and second call clients in said first and second computers, respectively, for establishing a data call between said first and second computers using said IP addresses in said database of IP addresses, said data call comprising live video exchanged from at least one video camera coupled to one of said first and second computers and comprising a network session between said first and second call clients;
    establishing a voice telephone call via a public telephone network between first and second users of said first and second computers, respectively, at least one of said first and second users being seen in said live video exchange;
    said first user initiating a first image viewer subclient under control of said first call client;
    said first image viewer subclient loading and displaying still image data specified by said first user on said first computer;
    said first image viewer subclient transmitting said still image data to said second computer using said network session;
    said second call in said second computer receiving said still image data, running a second image viewer subclient, and loading said still image data into said second image viewer subclient; and
    said second image viewer subclient displaying said still image data on said second computer;
    wherein said live video exchange is maintained simultaneously with display of said still image data by said image viewer subclients; and
    wherein said still image data is comprised of an array of pictures displayed in succession by said first and second image viewer subclients substantially simultaneously, a progression through said array being controlled in response to manual control signals generated by either said first user or said second user.

2. The method of claim 1 wherein said network session is comprised of direct transmissions between said first and second computers as source and destination of said transmissions, respectively.

3. The method of claim 1 wherein said network session is comprised of a first network session between said first computer and said central server and a second network session between said second computer and said central server, whereby said central server relays said live video exchange and said still image data.

4. The method of claim 1 wherein progression through said array is controlled in response to a timing sequence specified by said first user.

5. The method of claim 1 wherein said transmitted still image data is compressed data and wherein said second image viewer subclient decompresses said still image data prior to displaying.

6. The method of claim 1 wherein said voice telephone call is established in response to a target telephone number, said method further comprising the step of:
    transmitting said target telephone number to said central server for determining one of said IP addresses.

7. Computer apparatus for privately sharing still images residing in said computer apparatus with a remote computer via an internetwork for exchanging network packets, said computer apparatus and said remote computer having respective private IP addresses within said internetwork, said computer apparatus comprising:
    a telephone interface for capturing a target telephone number dialed on a telephone connected to said telephone interface;
    a call client for transmitting said captured target telephone number identifying said remote computer to a central server maintaining a database of IP addresses of registered computers, and for establishing a data call between said computer apparatus and said remote computer using said IP addresses in said database of IP addresses, said data call comprising live video exchange from at least one video camera coupled to one of said computer apparatus or said remote computer, and said data call comprising a network session; and
    an image viewer subclient under control of said call client for loading and displaying still image data specified on said first computer and for transmitting said still image data to said remote computer using said network session, wherein said image viewer subclient is responsive to manual control signals generated using either said computer apparatus or said remote computer for controlling progressive display of said still image data as a succession of pictures in an array;

wherein said live video exchange is maintained simultaneously with display of said still image data by said image viewer subclient.

8. A computer program embodied on computer readable medium for privately sharing still images in conjunction with a video telephony call between a resident computer and a remote computer via a computer network for video and a public switched telephone network for audio wherein a telephone interface captures a target telephone number within said public switched telephone network, computer program comprising:

a code segment for obtaining said target telephone number from said telephone interface;

a code segment for transmitting said target telephone number identifying said remote computer to a central server maintaining a database of IP addresses of registered computers;

a code segment for establishing a data call between said resident computer and said remote computer using said IP addresses in said database of IP addresses, said data call comprising live video exchange from at least one video camera coupled to one of said resident computer or said remote computer, and said data call comprising a network session; and a code segment for directing an image viewer subclient to load and display still image data specified on said resident computer and to transmit said still image data to said remote computer using said network session, wherein said image viewer subclient is responsive to manual control signals generated using either said computer apparatus or said remote computer for controlling progressive display of said still image data as a succession of pictures in an array, and wherein said live video exchange is maintained simultaneously with display of said still image data by said image viewer subclient.

* * * * *